United States Patent [19]
Lynn et al.

[11] Patent Number: 5,592,989
[45] Date of Patent: Jan. 14, 1997

[54] ELECTRONIC THERMOSTAT HAVING HIGH AND LOW VOLTAGE CONTROL CAPABILITY

[75] Inventors: Michael Lynn, Green Oaks, Ill.; Alan Morris, Matthews, N.C.; Richard A. Perry; June R. Carper, both of Charlotte, N.C.

[73] Assignee: Landis & Gyr Powers, Inc., Buffalo Grove, Ill.

[21] Appl. No.: 233,917

[22] Filed: Apr. 28, 1994

[51] Int. Cl.[6] .................................. F25B 29/00
[52] U.S. Cl. .................. 165/259; 236/1 C; 236/37; 236/38; 236/78 A; 165/50
[58] Field of Search .................... 236/96 R, 78 R, 236/78 A, 78 B, 1 C, 37, 38; 165/26, 50

[56] References Cited

U.S. PATENT DOCUMENTS

| | | |
|---|---|---|
| 2,727,106 | 12/1955 | Dillman . |
| 3,616,846 | 11/1971 | Wills ................................ 236/78 A |
| 3,918,636 | 11/1975 | Dawson ............................ 236/78 A |
| 4,352,349 | 10/1982 | Yoho . |
| 4,411,385 | 10/1983 | Lamkewitz . |
| 4,433,718 | 2/1984 | Bresin ................................ 165/12 |
| 4,506,827 | 3/1985 | Jamieson et al. ................ 236/46 R |
| 4,632,304 | 12/1986 | Newell et al. ..................... 165/26 |
| 4,659,290 | 4/1987 | Kundert . |
| 4,661,914 | 4/1987 | Mulokey et al. . |
| 4,688,547 | 8/1987 | Ballard et al. . |
| 4,694,890 | 9/1987 | Zarate ................................. 165/26 |
| 4,811,897 | 3/1989 | Kobayashi et al. . |
| 4,830,095 | 5/1989 | Friend . |
| 4,860,231 | 8/1989 | Ballard et al. . |
| 4,948,044 | 8/1990 | Cacciatore . |
| 4,978,896 | 12/1990 | Shah . |
| 5,107,918 | 4/1992 | McFarlane et al. ............... 165/12 |
| 5,261,483 | 11/1993 | Imaoka ............................. 165/12 |
| 5,485,954 | 1/1996 | Guy et al. ....................... 236/78 R |

*Primary Examiner*—John K. Ford
*Attorney, Agent, or Firm*—Greer, Burns & Crain, Ltd.

[57] ABSTRACT

An electronic thermostat having high and low voltage control capability and varied functional capabilities. The thermostat is particularly suited for use with fan coil heating and cooling units. Specifically the thermostat uses relays to actuate external devices such as heating and cooling equipment, fans and dampers. The use of relays permits control voltages for these external devices to be different (e.g. 24 VAC, 208–230 VAC or 277 VAC).

16 Claims, 7 Drawing Sheets

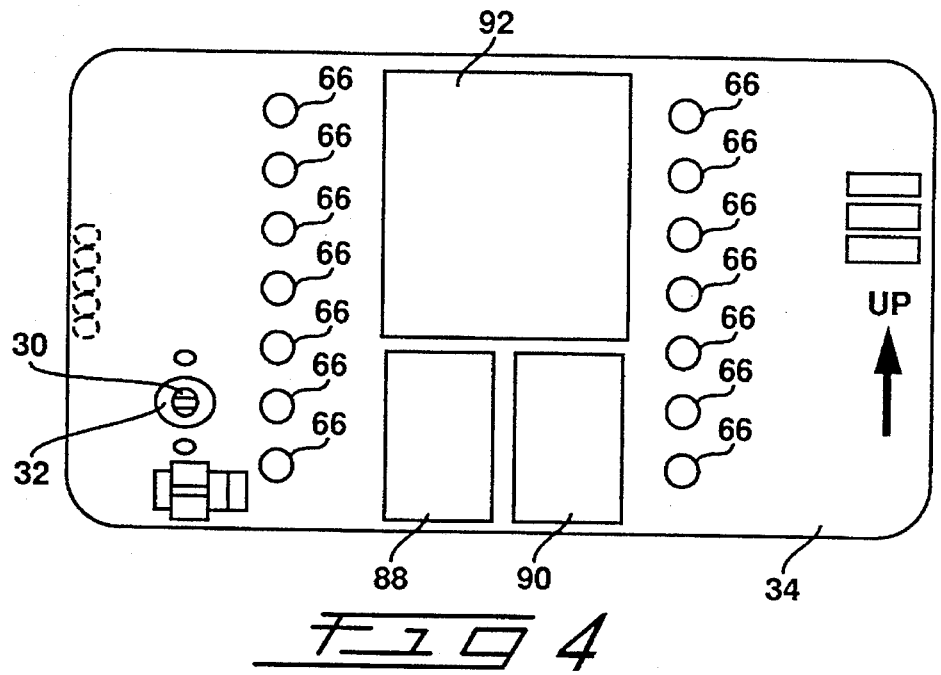
FIG. 4
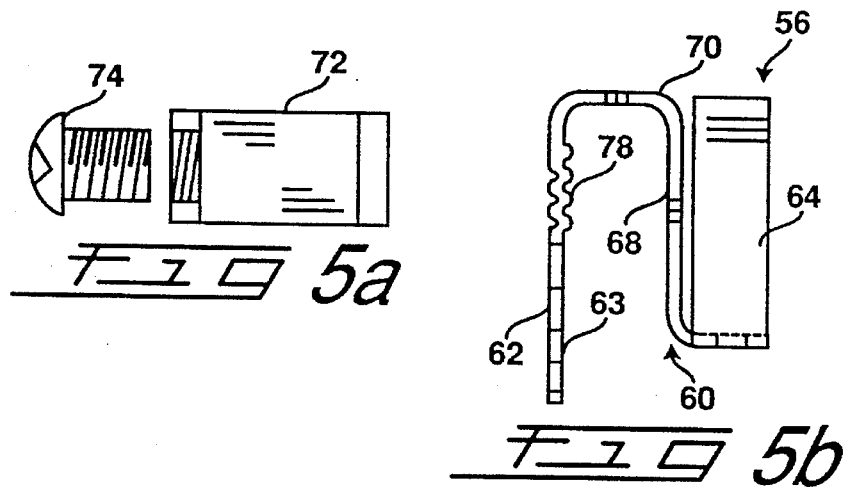
FIG. 5a
FIG. 5b
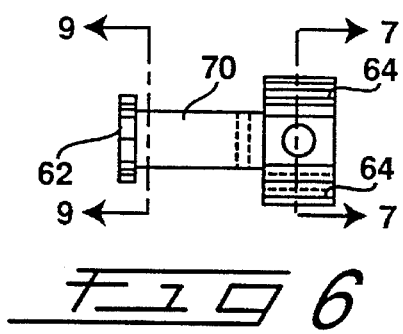
FIG. 6

ELECTRONIC THERMOSTAT HAVING HIGH AND LOW VOLTAGE CONTROL CAPABILITY

The present invention relates to electronic thermostats and more particularly to a thermostat that is adapted for controlling fan coil units, as well as similar heating and cooling devices.

Heating and cooling devices that are commonly found in many government buildings, schools and motels for controlling the temperature of individual rooms as well as entry ways, hallways and the like, are often referred to as fan coil units. Such units generally use a heating and/or cooling coil in conjunction with a fan to control the temperature of the space in which they are located. The system in which the fan coils are located can be what are referred to as two pipe systems in that the fan coils use a single supply line and a single return line to either heat or cool, with the supply line having either hot or cold water flowing through it depending upon the mode in which it operating. It should be understood that both hot and cold water cannot be supplied at the same time in a two pipe system.

Fan coil units can also be connected in a four pipe system which use a supply and return line for cooling, as well as a supply and return line for heating. Fan coil units often have the capability of providing auxiliary heat by operating electrical heating units that are a part of the fan coil unit. Such fan coil units typically have valves for controlling the flow through the supply and return lines, as well as fans for controlling the flow of air over the coils and dampers are typically provided for varying the proportion of indoor air and outdoor air through the unit. Fan coil units come in a variety of configurations and designs, including different operating voltages of the fans and auxiliary electric heating units, for example. It is common that fan coil units have operating temperatures of 24 volts, 120 volts, 208–230 volts and 277 volts. The control of the fan coil units can also be varied in that dampers controlling the amount of outside air that is to be heated or cooled for providing a higher indoor air quality can be varied, as well as the capability of controlling the valves and thereby the flow of heating and/or cooling fluid from the supply or supplies. Also, the speed of the fan which controls the amount of air that is passed over the coil that represents the heat exchanger for the unit can be controlled.

Regardless of the design and configuration of the fan coil units and the manner in which they are primarily controlled, a thermostat is necessary to control the operation of the unit. Because of the varied operational characteristics that are possible, a single thermostat design has heretofore not been available which can operate a large portion of the entire spectrum of the different fan coil units that commercially available. Moreover, because of the different operating voltages that are available, Underwriter Laboratories compliance specifications have resulted in thermostats being separated from control relays and the like, and this has caused increased costs to users because of the necessity for installing switches, relays and associated controls that are separated from the thermostat.

Accordingly, it is a primary object of the present invention to provide an improved thermostat for controlling fan coil devices which may have many different and varied operating and design characteristics.

Another object of the present invention is to provide such an improved thermostat which is capable of being mounted on the fan coil unit or on a wall and which can provide control of high voltage end devices such as dampers, switches, valves and the like, as well as low voltage end devices, with such control being accomplished from a single thermostat that has separated high voltage and low voltage sections. By virtue of the unique design, the thermostat is capable of being mounted to a common 4×4 inch square electrical box and requires only the placement of a separating partition in the middle of the box to isolate the high voltage section from the low voltage section.

Another object of the present invention is to provide such an improved thermostat which is capable of being easily configured to operate any of a number of fan coil units having different operating voltages and operating characteristics by simply configuring the thermostat by placing or removing a number of jumpers.

A more detailed object is to provide such an improved thermostat which can be easily configured to operate as a fan speed control mode of operation, as opposed to a valve and damper type of control if desired.

Still another object is to provide an improved thermostat which is capable of operating with fan coil devices that are installed in either two pipe or four pipe systems.

Yet another object of the present invention is to provide such a thermostat which has a microprocessor used to generate control signals in response to input signals that are provided by temperature sensors and other circuit conditions, and which automatically provides the appropriate control functionality for the type of system in which the fan coil is configured for.

Still another object of the present invention is to provide an improved thermostat which has the capability of controlling auxiliary electric heating of a fan coil as well as the control valves and dampers thereof, and is also adapted to utilize remote temperature sensing devices if installed as opposed to an on board sensing device that is provided as part of the thermostat.

Another object of the present invention is to provide such an improved thermostat which has a test sequence that can be run preferably during installation which determines if the installed thermostat will properly function during actual use.

Other objects and advantages will become apparent upon reading the following detailed description, while referring to the attached drawings, in which:

FIG. 4 is a view of the printed circuit board from the inside of the cover portion;

FIG. 5 is an exploded plan view of a connector assembly of the present invention;

FIG. 6 is an end view of a portion of the connector assembly shown in FIG. 5;

DETAILED DESCRIPTION

Broadly stated, the present invention comprises a thermostat that is particularly adapted for use in controlling the operation of a variety of heating and cooling devices and is particularly suited for controlling fan coil heating and cooling devices, such as are used in government building, schools, motel rooms and the like. While the thermostat is particularly useful in controlling fan coil units, it is certainly not limited to control of such specific units, but can be used to control any number of heating and cooling devices of which thermostatic control is useful and which desirably controls mechanical end devices such as valve operators, fans and dampers that are connected to a thermostat or a controller. The thermostat of the present invention is extremely flexible in its functional operation, and is designed to control end devices that may have operating voltages that vary within a substantial range.

In this regard, the thermostat of the present invention is adapted to have 24 volts alternating current (VAC) control and also can directly control devices having operating voltages of 120 VAC, as well as 208–230 and 277 VAC. The thermostat can be set for any one of these operating voltages and has onboard relays that can switch end devices having any of the aforementioned operating voltages and can control current loads of up to several amps even when operating at the 277 VAC. The device conforms with UL 873 specifications and can be mounted on the fan coil unit itself or can be wall mounted. The thermostat can function to provide automatic control or manual control in either a heating or cooling mode of operation. The thermostat can also function in an on/off mode of control and can also function as a fan speed on/off controller or a temperature controller that functions either in an automatic or heating or cooling mode, as well as in an on/off temperature controller mode. The thermostat has a dial knob for specifying the temperature set point for the space to be controlled. The end devices can operate at 24 VAC or at the afore mentioned higher line voltages.

When the thermostat is intended to to control 277 VAC end devices, it can directly control and operate valves and fan motors that operate at 277 VAC. When the thermostat is mounted remotely on a wall, it cannot directly control 277 VAC end devices, and in this configuration, the thermostat provides 24 volt output signals to control relays that are located in a fan coil unit. The thermostat is designed so that if the voltage levels of the supply power are not as specified, the thermostat will go into a deenergized state so that unpredictable operation does not occur, i.e., the thermostat is brown out protected.

Figure 1:
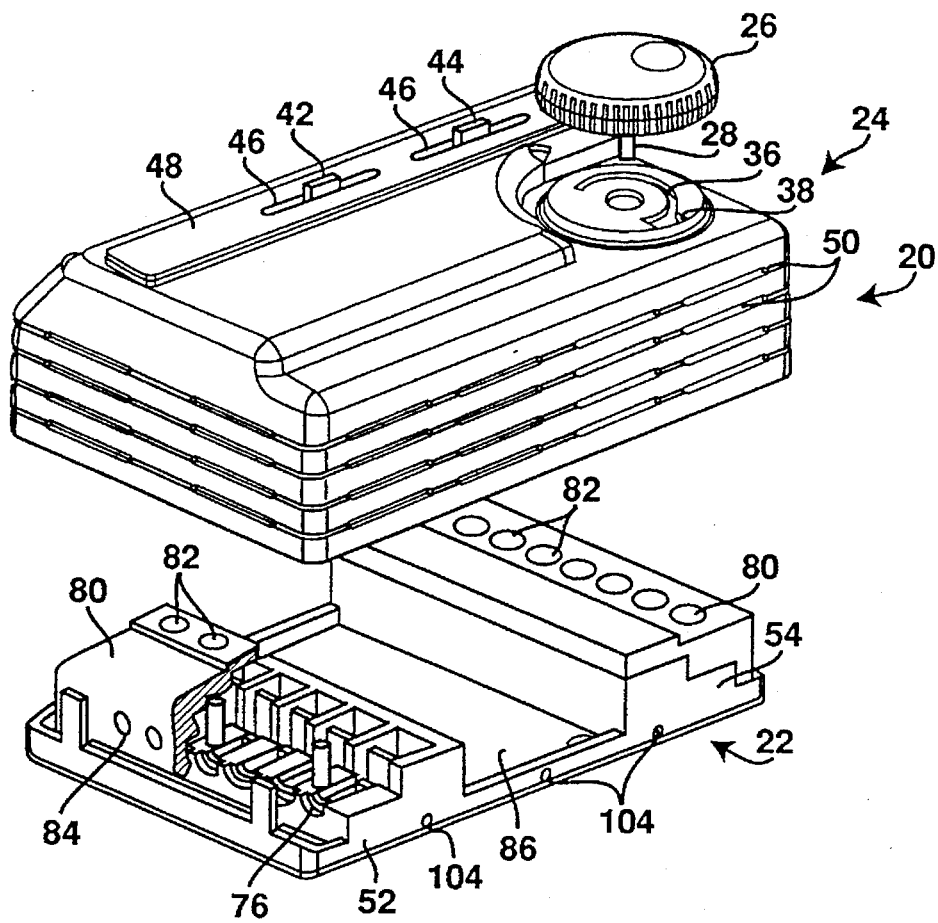
FIG. 1 is a perspective view of the thermostat embodying the present invention shown with the cover and base portions separated from one another.

Turning now to the drawings, and particularly FIG. 1, a thermostat embodying the present invention is indicated generally at 20, which is an exploded perspective view. The thermostat has a base portion, indicated generally at 22, a cover portion, indicated generally at 24, with a temperature set point rotatable dial knob 26 for setting a nominal set point temperature. The knob 26 is adapted to be connected to the cover portion 24. The dial knob 26 has a stem 28 that has a split end 30 (FIG. 4) that is adapted to be mechanically connected to a potentiometer 32 that is mounted to a printed circuit board 34 that is mounted to the inside of the cover portion 24. The dial knob 26 can be removed by using needle-nose pliers to pinch the split ends 30 together so that the dial knob 26 can be removed. The cover portion has a semi-circular opening 36 in which an extension (not shown) can fit and which limits the rotation of the dial knob 26 through a predetermined arc that corresponds with the high and low setting of the thermostat which has temperature indicating indicia printed thereon.

When the dial knob 26 is removed, an enlarged opening 38 reveals an exposed jumper which can be shorted for the purpose of initiating a test sequence to determine if the thermostat is operating properly. Once the test jumper is shorted, the test sequence is started by rotating the set point potentiometer fully clockwise to initiate the test without a changeover temperature test. It can be rotated fully counterclockwise to initiate the test with a changeover temperature test. The start determines if the room or air temperature is greater than 60 degrees F. and less than 80 degrees F.

Start:

```
05   Timer = 0
10   If set point at maximum value then go to 40
20   If set point not at minimum value then go to fail
30   If changeover temperature >60° F. and <80° F.
     then go to 40, else fail
40   If room or return air temperature >60° F. and
     <80° F. then go to 50, else go to fail
50   If normally closed input = short then go to 60,
     else go to fail
60   If timer = 5 seconds then complement output 1,
     output 2, damper, 2nd heat stage
65   Set timer = 0
70   Go to 10
```

Fail:

```
80   Set Output 1, Output 2, Damper, 2nd Heat
     Stage = relays energized
90   Go to 5
100  End
```

To stop the test, it is merely necessary to remove the jumper and replace the set point dial by pushing the dial knob stem 28 back into its installed position.

The thermostat also has a microprocessor 40 and a pair of slide switches 42 and 44 which control the fan and operating mode of the thermostat respectively. The microprocessor 40 (see FIG. 11b) is preferably a Motorola HC05 microprocessor that is modified to perform the functionality that is described herein.

Figure 12A:
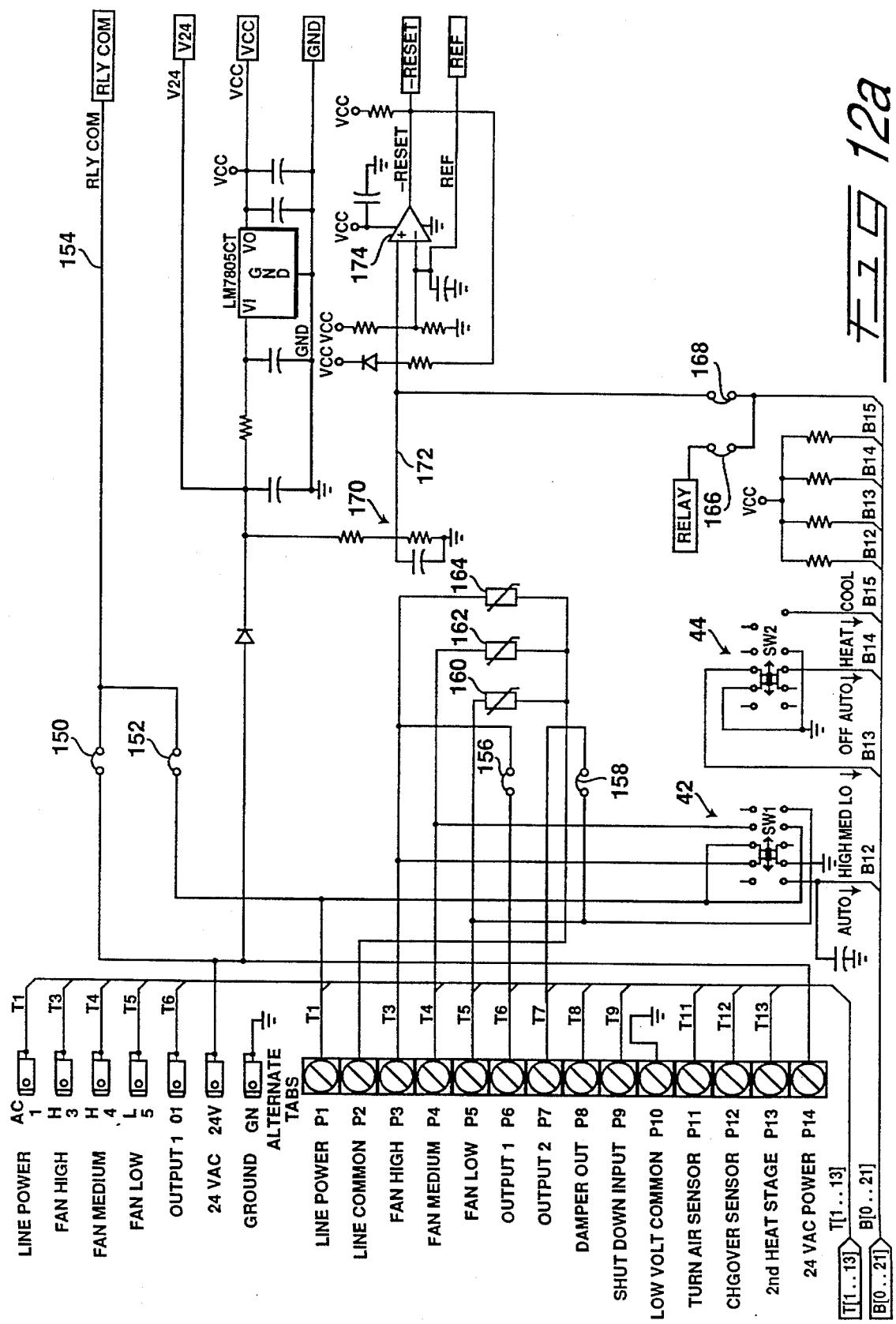

With respect to the fan speed control 42 shown in FIG. 1 and also referring to FIG. 12a, it is a preferably four position switch which has OFF, HIGH, MEDIUM and LOW positions from left to right, which results in the fan being switched from OFF to HIGH speed before it can be lowered to MEDIUM or the LOW speed setting. With respect to the switch 44, its left position is OFF and the other positions are AUTO, HEAT and COOL modes of operation. The switches are slidable within slots 46 that are formed in a rectangular insert 48 that is preferably permanently bonded to the cover portion 24 and the insert can have slots 46 of varying lengths to limit the travel of the switches, if the particular thermostat configuration limits the functionality of the thermostat. For example, with respect to the fan speed switch 42, there are applications where it is desired that the fan never be turned off and in such event, the off state is effectively eliminated by having a shorter slot 46 that blocks the leftward movement of the switch 42 to the off position. The cover portion 24 also has a plurality of openings 50 located around the four sides of the thermostat which are provided to permit circulation of air to the interior of the thermostat where a temperature sensing thermistor is located.

In accordance with an important aspect of the present invention, the base portion 22 is easily separable from the cover portion 24 and the base portion is adapted to be connected to electrical conductors that extend to the fan coil unit that is to be controlled. Both the cover portions and base portions are made of plastic, preferably Cycolac ABS plastic which has a UL94-5VA flammability UL rating and the base portion 22 has two connector sections 52 and 54, each of which has seven connectors for connecting the outside lines to the thermostat.

Each connector section 52 and 54 has seven individual connector assemblies 56, which are comprised of components that are shown in FIGS. 5–9. The base portion 22 has an opening 58 for each connector assembly which extends completely through the base portion. The opening 58 is adapted to enable a terminal member 60 to connect electrical conductors or posts on the inside surface of the base portion 22 with conductors or wires on the outside surface. The terminal member 60 has a terminal lug 62 which extends through the opening 58 and has a small aperture 63 near the outer end thereof as is required for an industry standard spade lug. Alternatively, the connector assembly 56 is adapted to connect to a conductor or wire by loosening the terminal member 60 relative to the leftward side of the opening 58 so that a conductor or wire can be inserted between the wall of the opening and the lug 62 and then the lug 62 can be tightened up by moving it toward the side wall to secure the conductor therebetween.

Figure 2:
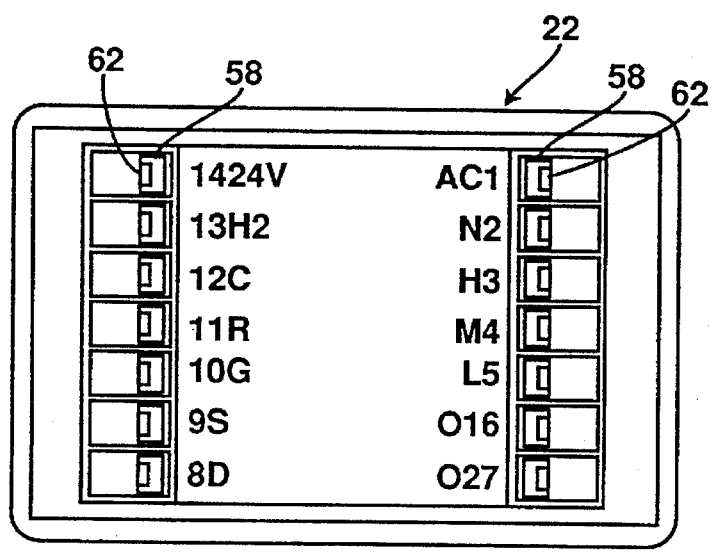
FIG. 2 is a bottom view of the base portion shown in FIG. 1.
Figure 10:
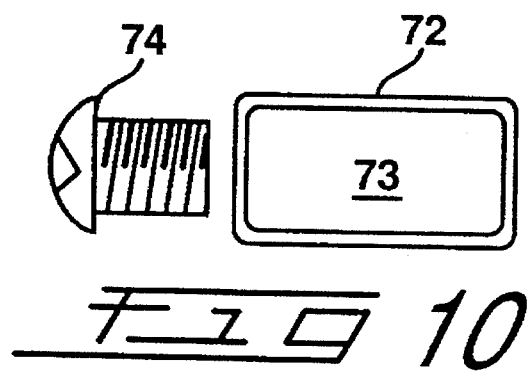
FIG. 10 is a plan view of a clamp member and screw of the connector assembly of the present invention.

Each terminal member 60 also has a pair of holding arms 64 that are adapted to receive a post-connector 66 mounted to the printed circuit board 34 which is attached to cover portion 24. The terminal member 60 also has a connecting portion 68 and a neck portion 70. While FIG. 5 shows the terminal member 60 adjacent to a clamp member 72, in the assembled connector assembly, the clamp member 72 which is square and has an center opening 73 as shown in FIG. 10 adapted to have the terminal lug 62 pass through it so that when the clamp member 72 is moved to the left, the terminal lug 62 is pulled tightly against the adjacent surface or side wall of the opening 58 in the base plate as shown in FIG. 2. The clamp member 72 is tightened by means of a screw 74 which is adapted to abut against one of the associated annular surfaces 76 (see FIG. 1) formed in the connector sections 52 and 54. The terminal lug 62 is provided with mechanical resistance means such as serrations 78 formed in the lug 62 that engage the wire and hold it so that it will not be easily pulled out when the thermostat is installed. In this regard, it is necessary for high voltage wire connections of the type contemplated herein be able to withstand a pulling force as specified in UL 486E. For up to 14 AWG wire, the connection must withstand 11.5 pounds pull out force, and the serrations in the terminal lug 62 enable the connector assembly to comply with this test.

Each of the connecting sections 52 and 54 have a connector cover 80 that snap fits and is retained by the base portion 22 and the connector cover has a number of openings 82 for receiving the posts 66 and also have a number of side openings 84 which provide access to the screws 74 for connecting the external wires to the thermostat connectors. The base portion has a generally open center portion 86 which is provided to make room for larger sized components that are mounted to the printed circuit board that is located in the inside of the cover portion 24.

Figure 3:
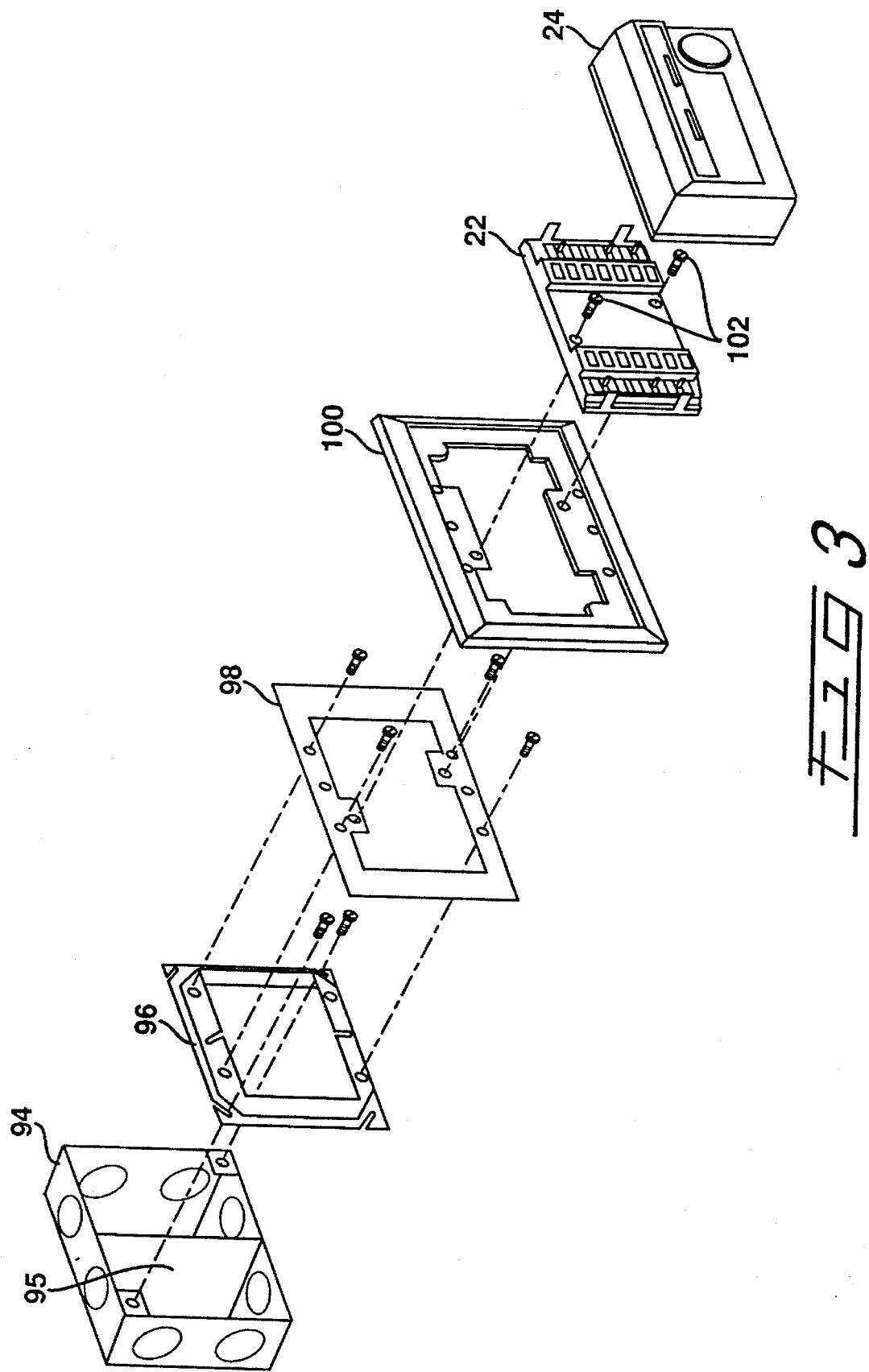
FIG. 3 is an exploded perspective view of a thermostat mounted to a conventional 4×4 inch electrical square box.
Figure 7:
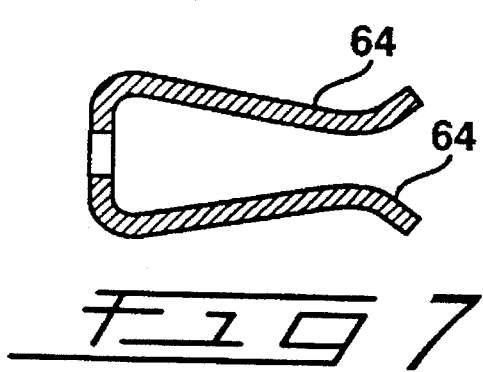
FIG. 7 is a cross section taken generally along the line 7—7 in FIG. 6.
Figure 8:
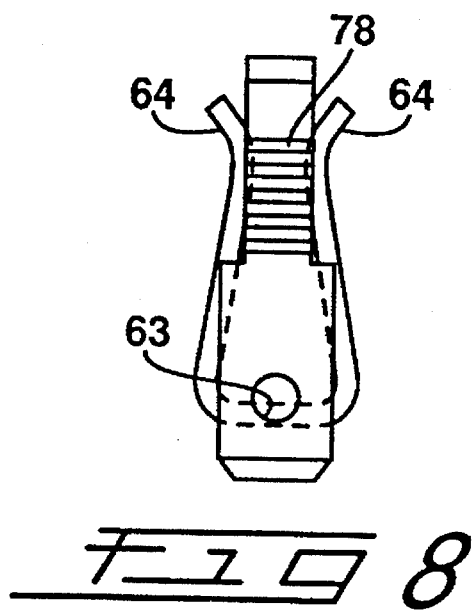
FIG. 8 is an end view of the connector assembly of FIG. 5.
Figure 9:
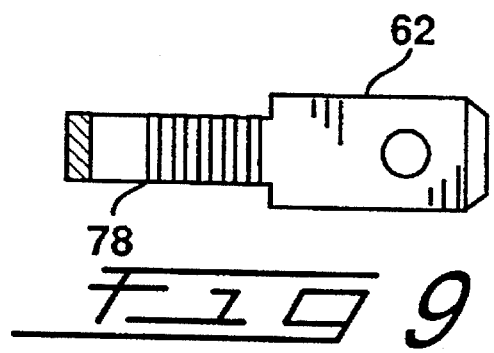
FIG. 9 is a cross section taken generally along the line 9—9 in FIG. 6.

More particularly, and referring to FIG. 4, the thermostat may include relays 88 and 90 as well as a transformer 92. The space 86 also separates the connector sections 52 and 54 and in accordance with an important aspect of the present invention, one of the connector portions 52 is connected to the low voltage circuitry whereas the section 54 is connected to the high voltage circuitry connectors. This is particularly significant in that the thermostat is adapted to be mounted to a conventional 4 inch square box 94 shown in FIG. 3, for a wall mounted installation. If the thermostat 20 is to control end devices in the fan coil unit that have an operating voltage that is one of 110 VAC, 208–230 VAC or 277 VAC, the thermostat is adapted to control such devices as long as a partition 95 is installed in the 4 inch square box as shown. With such partition, Underwriter Laboratories specifications are complied with. The installation may desirable include a conventional plaster ring 96 attached to it and a trim plate 98 may be attached to the plaster ring 96 by conventional screws. A decorative wall plate may be provided and is preferably designed to receive the base portion 22 which is attached by two screws 102 and the cover portion 24 can be attached to the base portion 22. While the holding arms 64 receive the posts 66 in frictional engagement and provide a holding force, the cover portion 24 also has a number of cooperative recesses on the inside surface thereof (not shown) into which protrusions 104 are provided so that the cover portion 24 will snap fit on the base portion 22 when the cover portion is pressed onto the base portion.

Figure 11:
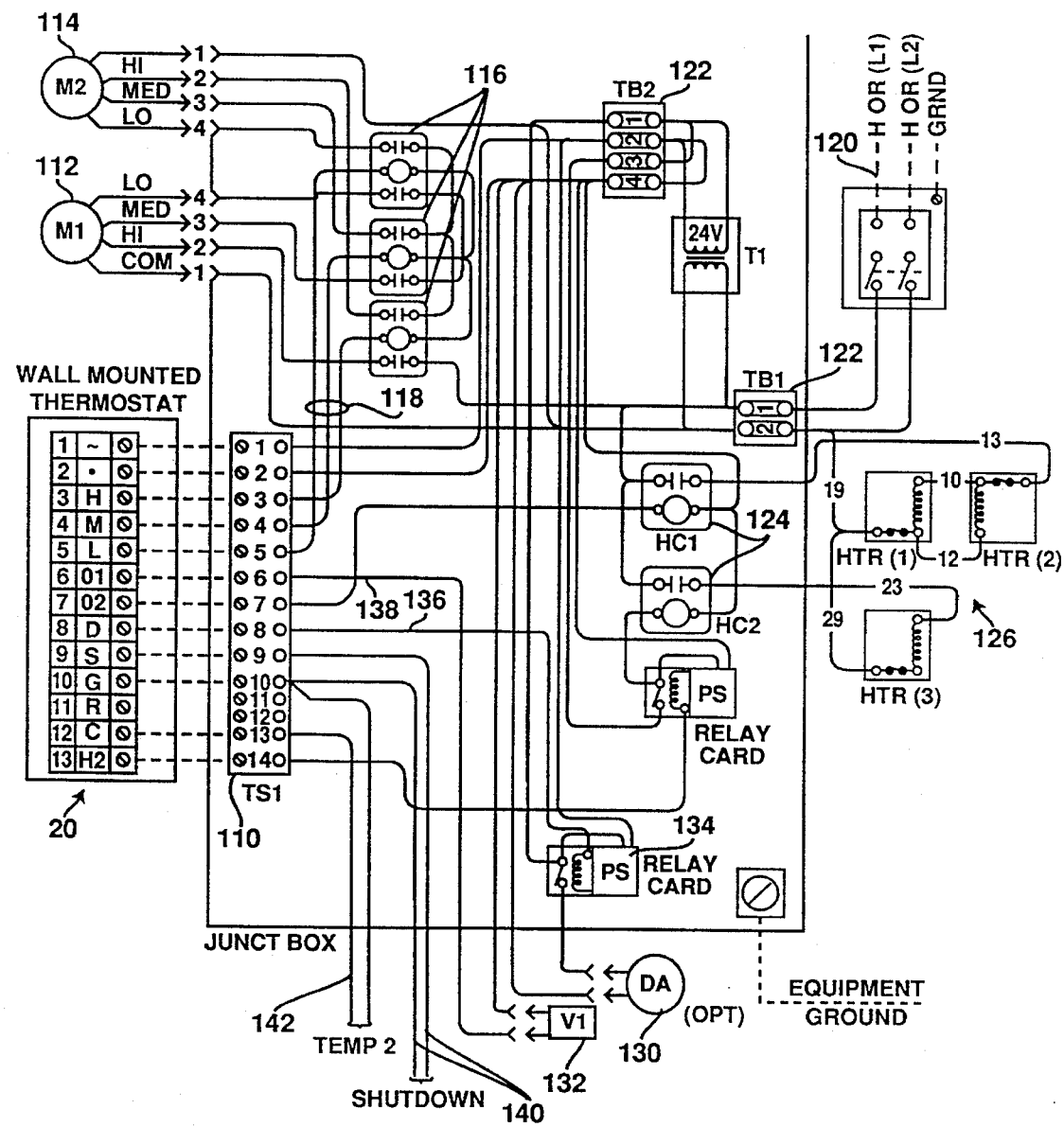
FIG. 11 is an electrical schematic circuit diagram of an installation of the thermostat in an application of a low voltage fan coil unit; and, FIGS. 12a and 12b together comprise an electrical circuit schematic diagram of the circuitry of the thermostat of the present invention.

As previously mentioned, the thermostat embodying the present invention is adapted for use with low voltage installations as well as the other three aforementioned operating voltages of 120 volts, 208–130 volts and 277 volts. The thermostat is also adapted for use with fan coils having two pipe and four pipe installations. A two pipe low voltage installation is shown in FIG. 11 which is generally representative of the type of end devices and circuitry that are utilized regardless of the voltage level. In the schematic diagram of FIG. 11, the thermostat 20 is shown to be connected to a terminal strip 110 located within a junction box in the fan coil unit and the circuitry of a fan coil unit includes fan motors 112 and 114 which are powered by relays 116 pursuant to control signals being applied on one of the three lines 118 which activates the appropriate one of the relays to provide either the high, medium or low fan speed. Power is supplied on line 120 and fuse blocks 122 are provided at the input. Electrical contactors 124 are used to control the application of auxiliary electric heaters indicated generally at 126, the operation of which are controlled by lines 128.

The fan coil unit is shown to have a damper 130 as well as a valve 132 for controlling the flow of fluid through the fan coil. The damper 130 operation is controlled by a relay card 134 that is controlled by line 136 from the thermostat 20 and the valve is controlled by line 138 also from the thermostat. The thermostat may have a shut down circuit provided by lines 140 which may be connected to a condensate overflow sensor or a freeze protection sensor. If either of these conditions occur, it may be desirable to shut down the thermostat. Lines 142 are connected to a changeover sensor which is a temperature sensor and provides the thermostat with information relating to the temperature of the fluid that is in the supply line of the fan coil.

Turning now to the operation of the thermostat, the switch 42 controls the fan and the fan speed cycling when the thermostat is placed in automatic operation by appropriately positioning the switch 44. Switch 44 controls the heating and cooling functions whereby the HEAT position corresponds to manual heating. When in the manual heating mode, there is no cooling that will occur. The COOL setting corresponds to manual cooling and in that position no heating will occur. The AUTO or automatic setting by switch 44 corresponds to automatic heating and cooling with changeover, with changeover being controlled by a remotely mounted sensor in the two pipe systems. In the four pipe systems, the microprocessor 40 determines whether heating or cooling should be automatic changeover. The OFF position of switch 44 turns the fan coil and the thermostat off. In that position all end devices such as valves, dampers and the like go to a deenergized state. In the case where normally open two way valves are used in the fan coil, OFF corresponds to the valves being fully open. When switch 44 is limited to being merely an on and off switch, the thermostat will determine heat or cool automatically and no manual heating or cooling function is then available. However, even if the switch 44 is in the OFF state, the fans may continue to operate.

In the two pipe system, only one valve is used and the auxiliary electric heat is available in two pipe control. In a four pipe system installation, two valves are used and one valve is for cooling control direct acting and a second valve is for heating and is reverse acting. The thermostat microprocessor 40 will determine what the operating mode is via a changeover input. If a sensor is connected, two pipe control is used. If no sensor is connected, the microprocessor will operate in a four pipe control mode. Electric heat operation is not used in four pipe, but second heat stage heat is active. The outside air damper function is operating in the four pipe mode.

The changeover sensor indicates to the thermostat microprocessor 40 what the current operating state should be and in the heating operating state, the heat valve is enabled, but the cooling valve is disabled. Conversely, in the cooling state, the heat valve is disabled and the cooling valve is enabled. The changeover sensor creates a changeover to cooling when the temperature preferably exceeds approximately 85° F. and the heating changeover occurs preferably when the temperature is below approximately 55° F. At power up, the default state for changeover is preferably heating when the sensed changeover temperature is between approximately 55° and 85°.

It is preferred that electrical heat come in two steps, i.e., auxiliary and second stage. Auxiliary heating operates at a temperature determined by the set point dial minus the dead band of preferably approximately 3.6° or approximately 10° as is desired. Second stage heating is operated when the temperature is at the set point dial minus the dead band minus an additional approximately 1.8° F.

With respect to temperature control, when the measured temperature rises and crosses the set point temperature by approximately 0.9° F., the thermostat initiates a cooling sequence. The thermostat remains in the cooling state until the measured temperature falls below the set point temperature by approximately 0.9° F. Then the thermostat ends the cooling state and enters the dead band state. The heating function operates like the cooling function, but is dependent upon the fan coil piping. In a two pipe system, the thermostat can only enter the heating function after the changeover sensor indicates to the microprocessor that hot water is present. Once hot water is sensed, the heating function operates like the cooling function with the valve operating in a reverse action. As the measured temperature falls below the heating set point (the heating set point is the cooling set point minus the dead band temperature) by approximately 0.9° F., the valve is energized (same valve as cooling, operating in reverse action). The valve stays in the heating state until the measured temperature rises approximately 0.9° F. above the heating set point.

In the four pipe fan coil controller no changeover sensor is employed. The thermostat uses the difference between the measured and set point minus dead band temperature to enable the second valve for heating. The temperature air must also be 0.9° F. below the heating set point. The heating valve stays energized until the temperature rises approximately 0.9° F. above the heating set point. The measured temperature will come from a printed circuit board mounted sensor 32. When the thermostat microprocessor 40 detects that a remote return air sensor is connected, it will automatically use the remote sensor and disregard the PC board mounted sensor 32. Both temperatures are preferably sampled by the microprocessor at least once every five seconds.

With respect to the outside air damper, it is active in all thermostat configurations. It may or may not be connected to a damper in all fan coils. The damper output is a two state output. Damper minimum and maximum are preferably mechanically set at the damper actuator. The damper control has two operating modes which are IAQ (indoor air quality) and conservation. The IAQ mode results in the microprocessor forcing the damper open any time the fan is running.

Figure 12B:
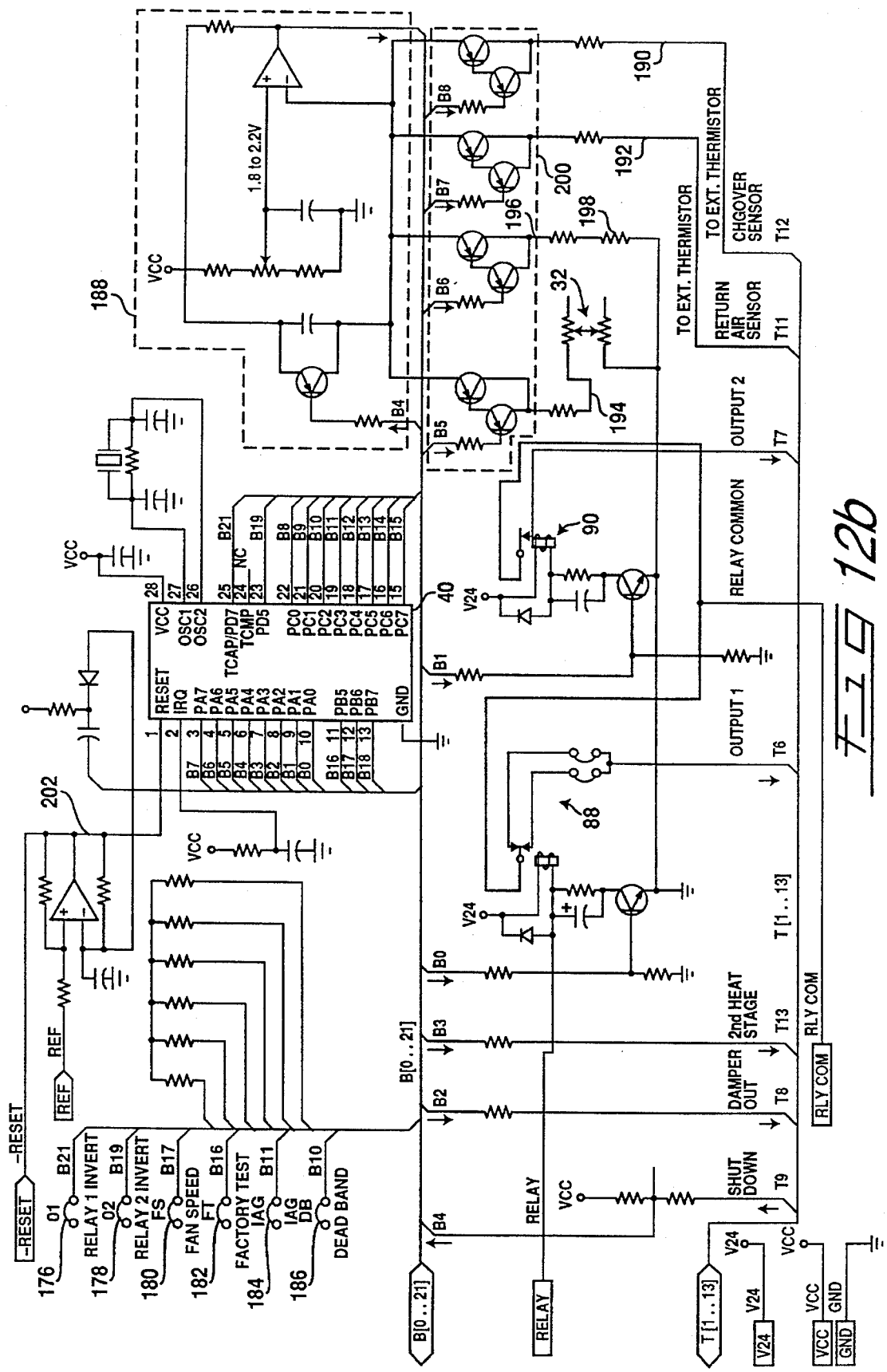

The thermostat has electrical circuitry to carry out the above described functionality and is illustrated in FIGS. 12a and 12b and the circuitry is present on the printed circuit board 34. The terminals 1 through 14 that are shown in FIG. 2, and which are electrically connected to the respective posts 66 shown in FIG. 4 when the cover portion 24 is attached to the base portion 22 as previously described, are also illustrated in FIG. 12a as terminals P1 through P14 on the left side thereof, and are also functionally identified adjacent the terminal designations.

The terminal block has the following terminals and associated description:

| Pin | Desig- nation | Description | Type Of Wiring |
|---|---|---|---|
| 1 | ~ | Line Power | High or low voltage AC |
| 2 | ● | Line Common | High or low voltage AC |
| 3 | H | Fan High | High or low voltage AC |
| 4 | M | Fan Medium | High or low voltage AC |
| 5 | L | Fan Low | High or low voltage AC |
| 6 | O1 | Output 1 | High or low voltage AC |
| 7 | O2 | Output 2 | High or low voltage AC |
| 8 | D | Damper Out | Low voltage DC |
| 9 | S | Normally Closed Input | Low voltage DC |
| 10 | G | Low Volt Common | Low voltage DC |
| 11 | R | Return Air Sensor | Low voltage DC |
| 12 | C | Changeover Sensor | Low voltage DC |
| 13 | H2 | 2nd Heat Stage | Low voltage DC |
| 14 | 24V | 24 VAC Power | Low voltage AC |

The lines connected to the terminals are identified with T designations as illustrated, and these lines are also present on FIG. 12b and are intended to denote electrical continuity or connection. Similar continuity is indicated on lines B0 through B21, as well as for REF, −RESET, VCC, V24, GND, RELAY, and RLY COM lines, as is well known to those skilled in the electronic arts.

The manner in which the thermostat is to operate is determined by the thermostat detecting circuit conditions, such as the presence of a remote thermistor, for example, and by the use of a number of jumpers. Referring to FIG. 12a, jumpers 150 and 152 determine the operating voltage of the end devices of the fan coil unit that the thermostat is to control. When jumper 150 is in circuit, the relay common line voltage on line 154(RLY COM) is 24 volts. When jumper 150 is in circuit, jumper 152 is out of circuit or removed, providing an open circuit. If the end devices are 120 VAC, 208 VAC or 277 VAC, then jumper 152 is in circuit and jumper 150 is removed.

If the thermostat is to control valves, a jumper 156 is in circuit. If it is desired for the microprocessor 40 to control the fan during automatic mode of operation, a jumper 158 is in circuit, and if the fans are to be manually controlled by the switch, and not microprocessor 40 controlled, the jumper 156 and 158 is removed. For manual control of the fan speed, the switch 42 has switched contacts 160, 162 and 164 which are closed depending upon the switch position, for selecting the high, medium or low speed operation of the fan.

A jumper 166 provides a switched auxiliary output for a remote relay when in circuit. This jumper is provided for the installation when a wall mounted thermostat 20 is used to control valves, dampers, and auxiliary electric heat, and another thermostat 20 is installed at the fan coil unit wherein the fan speed is set. This may typically occur when the fan coil unit is installed in the ceiling of a space or room. A jumper 168 forces valve to be closed when the fan is off to prevent sweating when this jumper is in circuit. The remainder of the circuitry shown in FIG. 12a includes a brown out detector, indicated generally at 170, which provides a voltage level on line 172 that is connected to one input of an operational amplifier 174 and which provides a reset output when the detected voltage is below approximately 18 volts.

The circuitry of FIG. 12b includes the microprocessor 40 and the relays 88 and 90. At the upper left portion of the drawing are a number of jumpers, including jumpers 176 and 178 which are used to select control of the valves as being normally open or normally closed. A jumper 180 is provided which when in circuit results in the thermostat controlling heating and cooling operation by controlling the valves. When the thermostat is used to control fan speed for controlling heating and/or cooling, the jumper 180 is removed. To have the thermostat operate in this manner, the thermostat switch 42 must be set in the AUTO or automatic position. In this operating mode, the fan will always start in the high operating speed for approximately 0.5 seconds and then be switched to the appropriate speed state.

A set of contacts 182 are provided for performing the autotest cycle, which can be done by shorting these contacts after having removed the dial knob 26 as previously described. A jumper 184 is provided for setting the amount of outdoor air that is to be admitted during operation. If in the IAQ mode, the jumper is in place and approximately 90% of the air used is outside air. If in the conservation mode, the jumper 184 is removed, and approximately 60% of the air is outside air. A final jumper 186 determines the dead band and is approximately 3.6 degrees F. when in circuit, and approximately 10 degrees F. when removed. The latter deadband value may be used in common areas, such as an entry way or hall where the temperature range may not be critical because of the transient usage of the space, for example.

The circuit includes an analog-to-digital converter 188 for converting analog values, such as the signal from the changeover sensor thermistor on line 190, the signal from the external temperature sensor thermistor on line 192, the signal from the set point potentiometer 32 controlled by the dial knob 26 on line 194, and the signal on line 196 from the temperature sensing thermistor 198 that is mounted on the printed circuit board 34. The transistors and resistors located in block 200 comprise a multiplexer for selecting one of the signals for application to the analog-to-digital converter 188. When reset line 202 is low as a result of a brown out or power fail condition, the microprocessor is reset.

From the foregoing, it should be appreciated that an improved thermostat has been shown and described which has many desirable attributes. The thermostat is designed to be extremely flexible in that it can be used in a large variety of applications, particularly with respect to the types of fan coil units that may be controlled by the thermostat. The thermostat is designed to control end devices of the type which are present in most fan coil units which can be 120, 208–230, or 277 VAC devices. The thermostat of the present invention can be easily installed on a conventional 4×4 inch square box with the use of a simple, easily installed partition and still comply with Underwriters Laboratories specifications.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. A thermostat for controlling heating and cooling equipment of the type which includes a fan and at least one end device consisting of at least one heating and cooling fluid control valve, at least one electric heating apparatus and at least one air damper, said thermostat comprising:

a base portion adapted to be mounted to a mounting surface;

a cover portion adapted to be attached to said base portion;

switch means for controlling the operation of the thermostat, said switch means being associated with said cover portion and being accessible for operation;

temperature setting means associated with said cover portion for setting a nominal temperature set point;

processing means being connected to one of said base and cover portions for receiving operating status signals and temperature indicating signals and for selectively generating output signals for controlling the heating and cooling equipment;

a first means for sensing the temperature of the air of a space in which the thermostat is to control;

a plurality of first connection means for connecting high voltage circuits associated with selected end devices;

a plurality of second connection means for connecting low voltage circuits associated with selected end devices;

said first connection means and said second connection means being separated from one another, said base portion being adapted to be attached to a conventional electrical box having a partition separating approximately one half of the interior from the other side thereof, each side being adapted to receive one of high voltage circuits and low voltage circuits, said partition separating said high voltage circuits from said low voltage circuits.

2. A thermostat as defined in claim 1 wherein said switch means further comprises:

a fan switch for controlling the operating speed of the fan;

a mode switch for selecting the operating mode of the thermostat.

3. A thermostat as defined in claim 1 wherein said temperature setting means comprises an adjustable set point potentiometer that has an operating means that is manually accessible from outside of the cover portion by an operator.

4. A thermostat as defined in claim 1 wherein said first and second connection means are attached to said base portion, each of said first connection means being located at a first end portion and each of said second connection means being located at a second end portion opposite said first end portion.

5. A thermostat as defined in claim 1 wherein said high voltage circuits have voltage levels within the range of approximately 110 volts AC to approximately 277 volts AC.

6. A thermostat as defined in claim 1 wherein said low voltage circuits have voltage levels below approximately 30 VAC.

7. A thermostat as defined in claim 1 wherein said first temperature sensing means is located in said cover portion, said cover portion having a plurality of openings adapted to admit air inside said cover portion.

8. A thermostat as defined in claim 1 further including signals that are indicative of sensed temperature from a remotely located temperature sensing means.

9. A thermostat as defined in claim 1 wherein said first temperature sensing means comprises a thermistor.

10. A thermostat as defined in claim 4 wherein said first and second end portions have a center space therebetween adapted to receive large components located in said cover portion.

11. A thermostat as defined in claim 2 further including at least one relay means for controlling one of said end devices, said relay means producing a selectively switched output signal of up to approximately 277 VAC.

12. A thermostat as defined in claim 11 further including a printed circuit board mounted to the inside of said cover portion, said processing means being mounted to said printed circuit board.

13. A thermostat as defined in claim 12 further characterized in that said relay means is mounted to said printed circuit board.

14. A thermostat as defined in claim 11 further including a plurality third connection means for connecting a plurality of circuit termination of said printed circuit board to said first and second connection means.

15. A thermostat as defined in claim 14 wherein each of said third connection means comprises posts which are electrically connected to one of said first and second connection means when said cover portion is attached to said base portion.

16. A thermostat as defined in claim 11 further characterized in that said fan switch and said mode switch are mounted on said printed circuit board, said fan and mode switches being multiple position switches having operating means which extend through apertures in said cover portion, so that an operator can change switch positions without removing said cover portion.

* * * * *